United States Patent [19]

Pasqualini

[11] 4,165,876
[45] Aug. 28, 1979

[54] CONTAINER FOR A LINE FOR TOWING AN AERIAL TARGET AND PROCESS FOR LOADING THE LINE INTO THE CONTAINER

[76] Inventor: Joseph Pasqualini, 82, voie du Parc de la Lande, Le Plessis Trevise, France, 94420

[21] Appl. No.: 854,680

[22] Filed: Nov. 25, 1977

[30] Foreign Application Priority Data

Dec. 1, 1976 [FR] France ............................... 76 36257

[51] Int. Cl.$^2$ ............................................. B64D 3/02
[52] U.S. Cl. .................................. 273/105.3; 40/215; 206/55; 206/83.5; 206/389; 206/407; 244/3.12; 244/1 TD
[58] Field of Search ..................... 244/1 TD, 3, 137 R, 244/147, 148, 312; 40/215; 242/170, 146, 129, 83; 89/1 G; 102/89 R, 63; 273/105.3; 206/407–409, 55, 83.5, 389

[56] References Cited

U.S. PATENT DOCUMENTS

| | | | |
|---|---|---|---|
| 795,980 | 8/1905 | Hubbard | 242/83 |
| 1,072,969 | 9/1913 | McCreary | 102/89 |
| 2,138,970 | 12/1938 | Jones | 273/105.3 |
| 2,183,540 | 12/1939 | Campbell et al. | 273/105.3 |
| 2,707,806 | 5/1955 | Wilkie | 206/83.5 |
| 2,953,377 | 9/1960 | Brust | 273/105.3 |
| 3,319,781 | 5/1967 | Simpson et al. | 242/170 |
| 3,749,017 | 7/1973 | Peterson | 244/147 |
| 4,033,528 | 7/1977 | Diggs | 244/147 |

FOREIGN PATENT DOCUMENTS

| | | | |
|---|---|---|---|
| 739709 | 11/1932 | France | 206/409 |
| 1570025 | 6/1969 | France | 244/1 TD |

*Primary Examiner*—Galen L. Barefoot

[57] ABSTRACT

A container for a line or cable for towing an aerial target, the container having a streamlined cylindrical body stowed under the towing airplane, with an open rear extremity into which the cable cartridge or loader is inserted. A pyrotechnical release device located near this rear extremity permits release of the line after the towing maneuver is completed. The loader is a tubular casing in which a piston is frictionally mounted. The cable is coiled in the casing on top of the piston. The front and rear ends of the cable project from the rear extremity of the loader.

9 Claims, 5 Drawing Figures

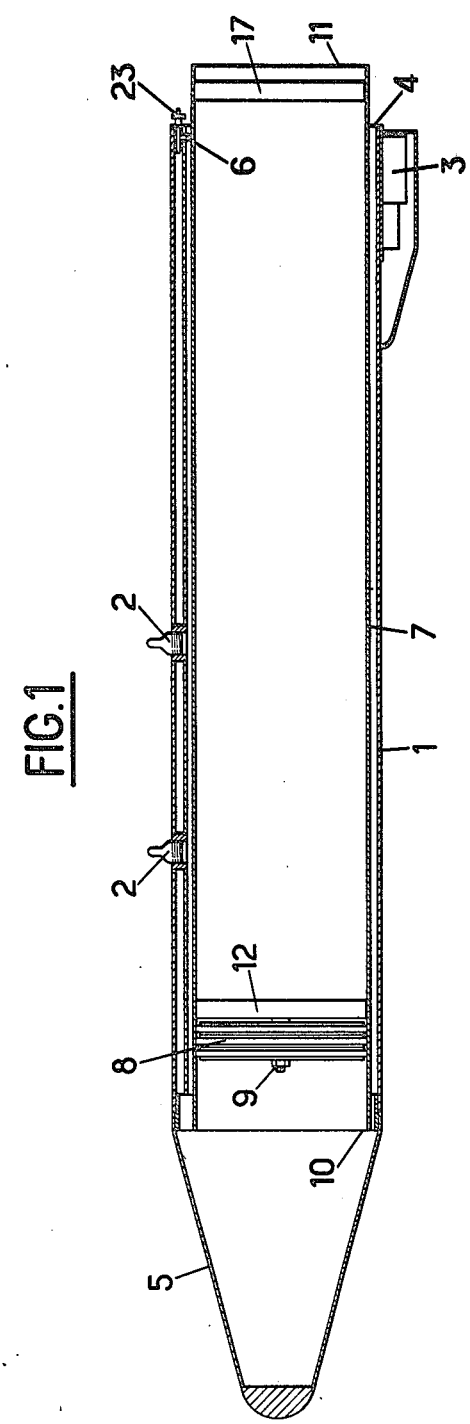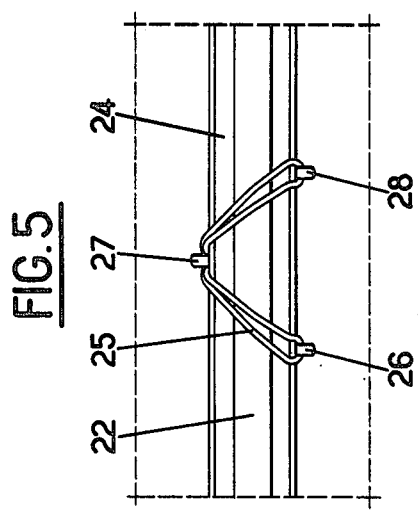

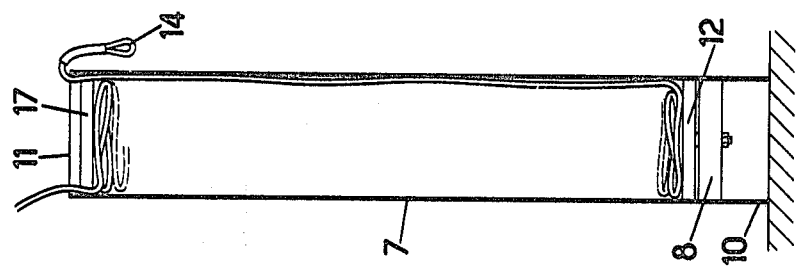
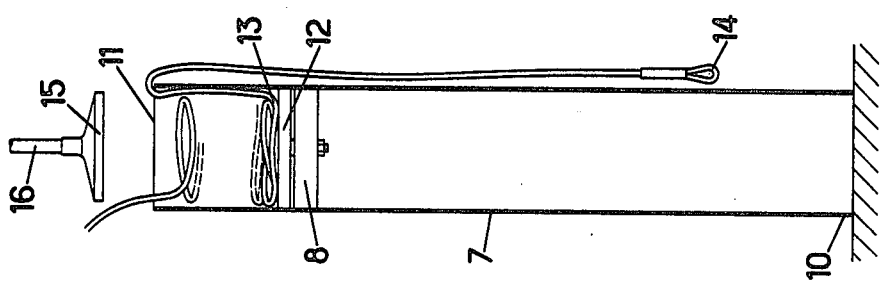
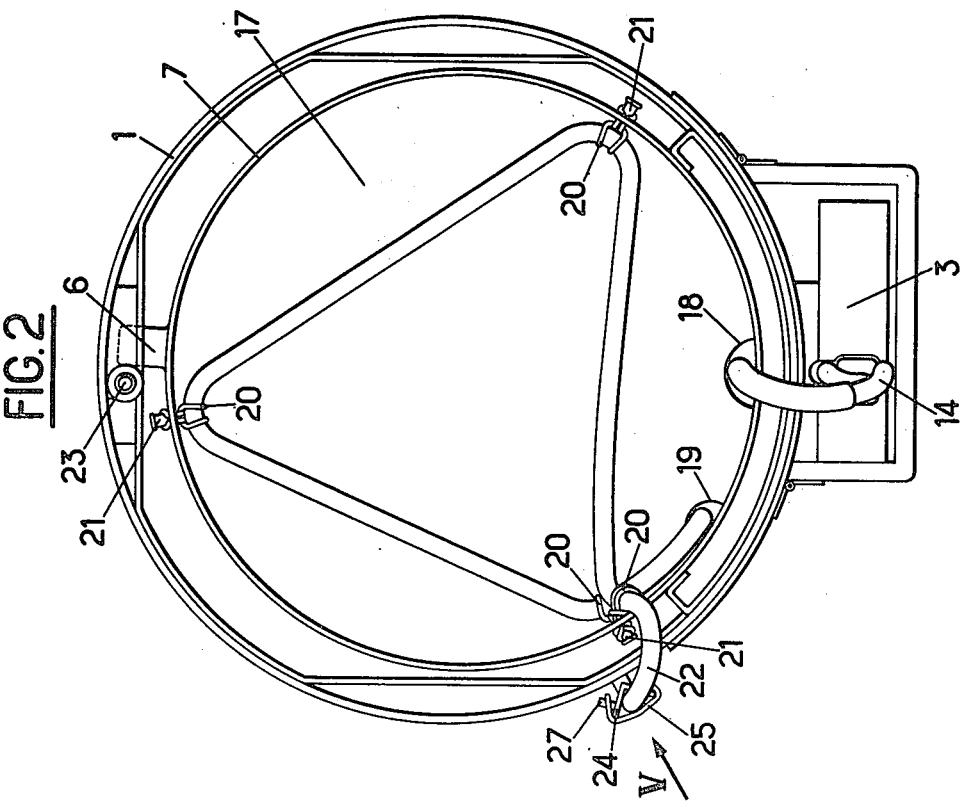

CONTAINER FOR A LINE FOR TOWING AN AERIAL TARGET AND PROCESS FOR LOADING THE LINE INTO THE CONTAINER

SUMMARY OF THE INVENTION

The invention deals with the towing of towable aerial targets and more particularly with the containers mounted under a towing aircraft to carry the towing line, rope or cable, to insure its uncoiling when the target is launched and, at the end of the mission, the controlled release of the cable and its target.

Usually, towing cables are coiled in zigzag fashion in successive horizontal layers in the same way that parachute cords are coiled, with separation of each hairpin turn, and separation of successive layers by appropriate means. This procedure is effective to avoid all tangling of the cable, but it is extremely burdensome both from the point of view of material and of the time necessary to put it in operation. Moreover, this approach results in a relatively heavy and cumbersome assembly.

The object of the invention is to provide a container and a process for its loading which results in solution to the problem which is more economical and lighter, while being as effective.

The invention consists of using a container body fastened under the towing airplane, open toward the rear and having near the rear opening a pyrotechnical release device of known type, remotely controlled from the airplane. In this body a tubular loader can be placed and locked, the loader containing the coiled cable with its two extremities routed to the rear in such a way that the front extremity of the cable can be hooked to the release device, and the rear extremity can be routed to the releasable target which is fastened under the towing airplane.

The loader or cartridge is made essentially of a section of cylindrical tube inside of which is frictionally retained a piston, capable of being displaced axially. The loading is effected by placing the loader vertically, with its rear extremity up and its piston at a small distance from the upper entrance, and beginning the coiling of the cable on this piston at the forward part of the cable, but with the forward extremity of the cable extending outside the loader tube by a length at least equal to the length of the loader. The cable is then disposed in essentially horizontal layers on the piston in the reduced height compartment defined by the piston and before the cable fills the entire upper space above the piston, the assembly of the cable and the piston is driven down by a tamping piston which has a shaft, until a new loading space of small height is again provided, and so on until the entire cable is packed. The upper entrance is then closed by a lightweight disk, preferably of expanded plastic material, having notches for the passage of the two extremities of the cable. The forward extremity of the cable is left free for its ultimate connection to the release device, while the rear extremity looped in the form of a triangle above the disk, to hold the disk, the three apexes or angles of the triangle being themselves held by rubber bands going through the wall of the loader and hooked on the outer wall. A sufficient length of cable extends beyond the triangle to go to the target, this length being eventually stowed on during travel by means of elastic bands, after placing the loader in the body.

Other features of the invention will appear in the description which follows, of an embodiment taken as an example and shown in the attached drawings.

BRIEF DESCRIPTION OF THE DRAWINGS

FIG. 1 is a longitudinal sectional view of the container assembly;

FIG. 2 is a large scale end view of the rear extremity of the container assembly of FIG. 1;

FIGS. 3 and 4 schematically show the sequence of the loading process at the beginning and the end of the operation;

FIG. 5 is an enlarged partial view looking along line V of FIG. 2.

The container of the invention is made of a cylindrical body 1 of lightweight alloy having at its upper part fastening devices 2 for hooking or otherwise securing body 1 under the fuselage or under the wing of the towing airplane. There is also an electrical connecting means (not shown) for energizing a remotely controlled cable end release which can be the pyrotechnical release device 3 of known type fastened on body 1 near the open rear extremity 4 of the body. The connecting means can take the form of a plug on an electrical cable for connecting release device 3 to a battery or other pyrotechnic initiator controlled by a switch from the cabin of the airplane. The forward extremity of body 1 is closed by a cone 5 to streamline the body 1 and reduce drag.

Into this body one is able to insert axially through the open rear extremity 4, and lock with a bayonet lock 6, a loader or cartridge 7 essentially in the form of tubular casing of lightweight alloy. In this casing is a piston 8 comprised of a stack of alternate rigid disks having peripheral shoulders and rubber segments or rings positioned between each pair of disks in the double shoulder thus formed, the stack being traversed by a bolt 9 whose tightening causes axial compression of the rubber segments and consequently their radial expansion, which thus allows adjusting the friction of the piston in the loader 7 to a value which permits its axial displacement but with a sufficient resistance. The towing cable or rope of textile fiber which is packed in this loader, has in general, a length of 500 m and a loop at each extremity.

To pack the cable in the loader, one places the loader 7 vertically, as shown in FIGS. 3 and 4, with its forward extremity 10 resting on a table so its rear extremity points up, and piston 8 is positioned in the loader near the upper entrance 11, as shown in FIG. 3. After placing an expanded polystyrene disk 12 on piston 8, one places on the disk, a point 13 of the rear part of the cable located at a distance at least equal to the length of the loader from its forward spliced extremity 14, the length of cable between point 13 and extremity 14 being positioned vertically along the inside and outside of wall 7 as shown in FIG. 3. The cable is then coiled axially, freely by simple gravity in the space of small height between the entrance of the loader and piston 8. This cable positions itself by a natural movement in horizontal layers until the space above the piston is filled.

Before this space is completely filled, one inserts through entrance 11 of the loader, a compressor piston 15 having a shaft 16 and one presses axially on the layer of cable thus positioned to pack or compress the cable. Then, in the same movement, further pushing toward the bottom both the layer of cable thus packed and piston 8, by virtue of the frictional mounting of the piston. Piston 15 is pushed down until there is again provided at the upper part of the loader, a space of small depth comparable to the preceding one in order to permit packing additional cable, and so on. The various layers of cable thus formed and packed superimpose themselves without discontinuity and as piston 8 descends, forward extremity 14 of the cable moves up until it occupies the position shown in FIG. 4 when almost all of the cable is packed in loader 7.

Then a second disk of expanded polystyrene 17, shown at FIGS. 1 and 4, and in detail in FIG. 2, is placed on the last layer of cable. This disk has at its periphery a notch 18 for the passage of the forward extremity 14 of the cable and a notch 19 for the passage of the rear part of the cable. The extension of this rear part is formed to a triangular configuration above disk 17, as shown at FIG. 2 and, at each of the vertices of the triangle, the cable is attached by an elastic band 20 of weak strength which passes through a hole made in the wall of loader 7 and is fastened on the outside of this wall on a lug 21 or rivet secured to this wall. The triangle of cable is thus held in place and also holds disk 17. From the triangle, the cable passes to the outside of the loader and has a length of cable 22 sufficient to connect to the target.

One can thus prepare in advance and stock a certain number of loaders to reduce handling at the time of use.

At the time of use, it is only necessary to insert a packed loader 7 in body 1 and secure it therewith bayonet lock 6 by rotation of body 7. The bayonet lock 6 can itself be locked by a supplementary means such as a pin or lock detent ball 23. Then, it is only necessary to hook the forward spliced extremity 14 of the cable to the pyrotechnical release device 3 and hook the portion following the rear extremity 22 to the target, which is fastened under the airplane. The path of portion 22 which extends from the rear extremity 4 of the body to the front of the target can itself be stowed in place in service by releasable elastic bands of the preceeding type. For example, if the target is placed right in front of container 1, the portion 22 of the cable is placed in the cavity between the legs of an angle 24, the stowing being assured by means of elastic bands 25 placed as shown in FIGs. 2 and 5, by hooking the bands on lugs 26, 27 and 28 placed alternately in groups of three on outside of the legs of angle 24. This stowing is extremely rapid.

The airplane can then take off, to proceed to the place for the towing, and release its target by the usual means. At the time of the release of the target, the various bands 25 are torn off as portion 22 of the cable is pulled away by the target, then the four bands 20 are successively torn off, which completely frees disk 17, after which the entire length of the cable is uncoiled progressively by the successive traversal of the layers without any possible tangling.

Finally, at the end of the mission or exercise the towing airplane goes back to its base, and before landing releases the target and the cable by activating the pyrotechnical release device 3. It can then land and receive, immediately if necessary, a new loader 7 and a new target, which only requires very little time on the ground.

The cable container of the invention is thus very practical to use and is at the same time, lightweight and relatively economical, considering the few parts required and the speed of coiling the cable, which is, however, effective and reliable.

I claim:

1. A container for the tow line of an aerial target to be towed behind an airplane comprising, a streamlined cylindrical body adapted to be stowed below the airplane, said body having an open rear extremity to receive a tubular tow line casing, a piston frictionally fitting in said casing and in spaced relation to a rear extremity of the casing, a tow line packed in said casing between said piston and the rear extremity and having front and rear ends extending from the rear extremity of the casing, said casing being positioned in said body with its rear extremity adjacent the rear extremity of the body, means for releasably securing the casing to said body, and remotely controllable release means on said container to which said front end of the tow line is attached for releasing the tow line after a target towing mission, and a lightweight disk adjacent the rear extremity of the casing and engaging the tow line packed in said casing, and means holding said lightweight disk in position and comprising, a disk retaining length of a rear portion of the tow line extending across an outside surface of and engaging said disk, and break-away means for connecting the disk retaining length of tow line to said casing.

2. A container according to claim 1 wherein said disk retaining length of tow line comprises a length forming a polygon, each corner of said polygon being connected to said casing by said break-away means.

3. A container according to claim 1 wherein an additional portion of the rear end of the tow line beyond the disk retaining length extends along a cradle fixed on said body, and break-away means retaining said tow line on an outer wall of said cradle.

4. A container according to claim 3 wherein each of said break-away means comprises, an elastic band.

5. A container according to claim 1 wherein said means for releasably securing the casing to the body comprises cooperating bayonet lock means on said casing and body to enable inserting said casing axially into said body and rotating said casing to lock same in the body.

6. A container according to claim 5 further comprising latch means to prevent release of said bayonet lock means.

7. A process for loading a cable in a casing releasably connectable to the body of a container adapted to be stowed under an airplane comprising, disposing the tubular casing vertically with its front extremity down and its rear extremity up, positioning a friction fit piston at a predetermined distance less than the length of the casing from the rear extremity of the casing to form a limited height space, coiling said tow line into the limited height space between the piston and the rear extremity of the casing and at least partially filling said space with said tow line, while maintaining a short length of the front end of the cable outside said casing, compressing the so coiled tow line with a tamping piston while forcing said friction fit piston downwardly into said casing to provide a new packing space of limited height, continuing the coiling of the tow line into the new packing space, repeating the coiling and tamping until a desired length of tow line is packed in said casing, closing the rear extremity of the casing with a lightweight disk, and connecting the rear end of the cable across the disk to hold said disk in position at the rear extremity of the casing.

8. A process according to claim 7 further comprising the step of mounting said casing in said tubular body.

9. A process according to claim 8 further comprising connecting a front end of the tow line to a remotely controllable release device on the body.

* * * * *